United States Patent Office 3,450,579
Patented June 17, 1969

3,450,579
PROCESS FOR THE CHEMICAL SURFACE
TREATMENT OF METAL
Werner Rausch, Stierstadt, Taunus, and Hans Hansen, Bergen-Enkheim, Germany, assignors to Hooker Chemical Corporation, Niagara Falls, N.Y., a corporation of New York
No Drawing. Filed Aug. 18, 1965, Ser. No. 480,813
Claims priority, application Germany, Aug. 25, 1964, M 62,208
Int. Cl. C23f 7/10, 7/14, 7/26
U.S. Cl. 148—6.16     6 Claims

ABSTRACT OF THE DISCLOSURE

A two-step process for treating metal surfaces wherein the metal to be treated is first contacted with an aqueous solution having a pH of from about 3 to 6, which solution contains phosphate ions, and, thereafter, with no intervening water rinse, contacting the thus-treated surface with an aqueous solution containing hexavalent chromium ions. Both the phosphate ion containing solution and the hexavalent chromium ion containing solution are substantially free of materials which form water-soluble residues on the metal surface treated.

---

This invention relates to a process for the chemical surface treatment of metals and more particularly it relates to a process for treating metal surfaces to provide a paint-base coating on such surfaces.

It has long been the practice to use a phosphate coating process to provide a chemical surface treatment of metal before the application of various organic protective coating, such as lacquers, varnishes, paints, plastic coatings, and the like. In these processes, the workpieces to be coated are brought into contact with aqueous solutions which contain dissolved phosphoric acid, alkali phosphates, or heavy metal phosphates. Typical of such processes and the processing steps involved in each are the following:

Phosphoric acid pickling

Step 1.—Treat with a 5 to 15% aqueous phosphoric acid solution containing about 1% of an acid-stable emulsion at a pH less than 2 to degrease, pickle and form an iron phosphate layer having a coating weight of about 0.03 gram per square meter.
Step 2.—Rinse with water.
Step 3.—Rinse with an aqueous solution containing hexavalent chromium.

Alkali phosphating

Step 1.—Treat with an aqueous solution of pH from about 4.0 to 6.0 containing 0.3 to 1% of an alkali ortho- and/or polyphosphate and a surface active substance to degrease and form an iron oxide-iron phosphate layer having a coating weight of about 0.3 gram per square meter.
Step 2.—Rinse with water.
Step 3.—Rinse with an aqueous solution containing hexavalent chromium.

Zinc phosphating

Step 1.—Treat with an aqueous solution containing 0.1% tetrasodium pyrophosphate, 0.01% of a surface active agent and 0.001% of titanium ortho phosphate to degrease.
Step 2.—Rinse with water.
Step 3.—Rinse again with water.
Step 4.—Treat with an aqueous solution containing 1.2% of $Zn(H_2PO_4)_2$ and 0.01% $NaNO_2$ at a pH of about 3 to form a zinc phosphate layer having a coating weight within the range of about 1.5 to 3 grams per square meter.
Step 5.—Rinse with water.
Step 6.—Rinse with an aqueous solution containing hexavalent chromium.

As is known in the art, the quality of the paint base coating produced by these typical processes as well as the protection afforded when the treated metal surfaces are coated with a protective coating material improves as one changes processes from process 1 up to process 3, the quality of coating obtained being the highest with process 3. Moreover, it is to be noted that in the typical processes indicated above the number of treatment steps is always at least 3 and in the case of process number 3 is 6. Even where, as in processes 1 and 2, the second step is a water rinse, it has been found that the omission of this water rinse between steps 1 and 3 results in a rapid fouling or contamination of the next treating bath and additionally, appreciably reduces the corrosion protection provided by subsequently applied protective coatings, particularly when the coated metal surfaces are used in areas of high heat and humidity, such as tropical or semi-tropical climates. Accordingly, attempts which have heretofore been made to reduce the number of treating steps in phosphate coating processes have not met with appreciable success.

It is, therefore, an object of the present invention to provide a novel two-step process for treating metal surfaces to form a paint base on the surface.

A further object of the present invention is to provide a novel two-step coating process of the phosphate coating type, which process gives results comparable to the alkali and zinc phosphating processes which have heretofore been used.

These and other objects of the present invention will become apparent to those skilled in the art from the description which follows.

Pursuant to the above objects, the present invention includes a process for treating metal surfaces which comprises contacting the surface to be treated with an aqueous solution containing an acidic phosphorus material and a surface active agent, which solution has a pH within the range of about 3 to about 6 and is substantially free of materials which produce water soluble residues on the treated metal surface, other than the surface active agent, forming a phosphate containing coating on the surface contacted and, thereafter, with no intervening water rinse, contacting the thus-coated surface with an aqueous solution containing hexavalent chromium, which solution is substantially free of materials which produce water soluble residues on the treated metal surface and cations which, with the phosphorus material, will reduce such materials. It has been found that by the use of this two step process, satisfactory degreasing of various metal surfaces and the formation of a good corrosion-protective layer which is an excellent base for lacquers, paints or similar protective coating, is obtained. Although various metals and alloy surfaces may be treated by this process, the method has been found to be particularly suitable for the cleaning and passivation of iron, steel, zinc and aluminum as well as various alloys containing these metals in predominant amounts.

More specifically, in the method of the present invention, the first aqueous treating solution contains an acidic phosphorus material in an amount sufficient to give the treating solution a pH within the range of about 3.0 to 6.0. Various acidic phosphorus materials may be used for this purpose, including phosphorus acids, such as ortho-, pyro-, and polyphosphoric acid; organic derivatives of phosphorus acids, such as vinyl phosphonic acid, mono- and di-esters of ortho phosphoric acid, and the like. Typical esters of ortho phosphoric acids which may be used are the mono and dialkyl esters containing from about 1 to about 4 carbon atoms in the alkyl group, such as monomethyl phosphate, diethyl phosphate, monopropyl phosphate, dibutylphosphate, and the like, and mono and diaryl esters such as monophenyl phosphate and diphenyl phosphate. Of the various acidic phosphorus materials which may be used, the preferred is orthophosphoric acid and for this reason, hereinafter primary reference will be made to this material.

As has been noted hereinabove, the acidic phosphorus material, such as the preferred orthophosphoric acid, is added to the first treating solution in an amount sufficient to provide a solution pH within the range of about 3.0 to 6.0. It will, of course, be obvious to those in the art that the amount of orthophosphoric acid which must be added to attain these pH values will vary depending upon the type of water used in making up the treating solutions. Thus, where the water used contains carbonic acid and is substantially completely free of salts, less acid will be needed then where the water used has an appreciable content of hardening components. Typical amounts of phosphoric acid to be added to attain the desired pH values in the treating solution are as shown in the following table. It is to be noted that the pH values given in this table are determined electrometrically using a glass electrode and that in referring to pH value in the solutions used in the method of the present invention it is intended to refer to pH values which have been determined in this manner. Additionally the water hardness values in this table and throughout the specification are given in German degrees of hardness.

TABLE I

| | Amount of $P_2O_5$ in grams per liter to attain pH (added as 75% $H_3PO_4$) | |
|---|---|---|
| pH | Salt-free water | Water having total hardness of 12.8° and carbonate hardness of 9.5° |
| 6.0 | | 0.09 |
| 5.0 | | 0.17 |
| 4.0 | 0.007 | 0.20 |
| 3.0 | 0.09 | 0.29 |

In addition to the acidic phosphorus material, the first treating solutions of the present invention also include at least one or more surface active agents, the low foaming non-ionic surface active agents being preferred. Typical of the surface active agents which may be used are those having the following formulae:

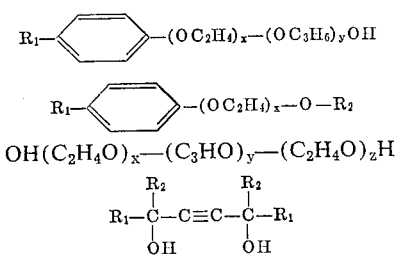

$$OH(C_2H_4O)_x—(C_3HO)_y—(C_2H_4O)_zH$$

$$R_1-\underset{\underset{OH}{|}}{\overset{\overset{R_2}{|}}{C}}-C\equiv C-\underset{\underset{OH}{|}}{\overset{\overset{R_2}{|}}{C}}-R_1$$

wherein $R_1$ is an alkyl group having from 1 to 20 carbon atoms, $R_2$ is an aryl group having 6 to 14 carbon atoms on an alkyl group having 1 to 20 carbon atoms, and $x$, $y$ and $z$ are numbers from 1 to 6.

In some instances, surface active material of the latter type, which have a relatively low boiling point, may be advantageous in that because of their low boiling point they evaporate from the metal surface in the drying oven so that there are not even traces of water-soluble materials remaining on the treated metal surface. Generally, however, non-ionic surface active agents of the alkyl polyoxyalkylene ether type have been found to be preferred for use in the process of the present invention.

It is to be appreciated that this metal treating solution should be substantially free of components which remain water-soluble upon drying on the metal surface, other than the surface active agents as has been described hereinabove. Exemplary of such materials which are to be avoided in the solutions for use in the present invention are alkali salts, ammonium salts, water soluble nitrates, nitrites, halides, sulfates, chlorates, and the like, as well as various organic materials such as sugar, glycerine and the like. It has been found that where materials of these types are present in the first treating solution, they are mechanically carried over into the second treating solution so that the workpieces which have been treated have on their surface residues of these substances which are water-soluble even after drying. It has been found that where a protective coating, such as a lacquer is applied over the residues, there results a premature blistering of the lacquer film, particularly where the coated pieces are used in hot, humid areas, such as tropical and semi-tropical regions. Accordingly, it is very desirable that the first treating solution of the present invention be substantially free of such materials which form water-soluble residues on the treated metal surface.

It has been found, however, that in addition to the acidic phosphorus material and the surface active agent, other cations may advantageously be included in the treating bath. These cations must, however, produce with the acidic phosphorus material neutral salts which are either insoluble or difficultly soluble. Exemplary of such cations which may be included in the compositions are zinc, manganese, magnesium, calcium, and iron. Generally, the saturation concentration of these cations in the present solution is quite low and generally lies appreciably below about 1 gram per liter. Even these small amounts, however, in some instances, have been found to exert a favorable influence on the layer formation of the coating since they appear to become built in as difficultly soluble salts in the layer. Additionally, in the case of trivalent iron cations, there has been found to be some acceleration of the layer formation process because of the oxidizing action of this ion. It is to be appreciated, as with treating solutions formulated only with phosphoric acid, the amount of the phosphate material utilized to give the desired pH in the solution will vary depending upon whether the water used in formulating these solutions is substantially free of salts or contains appreciable hardness. Typical examples of the amount of zinc, manganese, and iron phosphate solutions containing free phosphoric acid which are needed to attain the desired pH values are given in the following Table 2.

TABLE 2

| | Amount of $P_2O_5$ in grams per liter to attain pH | |
|---|---|---|
| pH | Salt free water | Water having a total hardness of 12.8° and a carbonate hardness of 9.5° |
| (a) Added as an aqueous solution containing 7.22% Zn and 26.71% $P_2O_5$: | | |
| 6.0 | | 0.08 |
| 5.0 | 0.01 | 0.45 |
| 4.0 | 0.05 | 0.61 |
| 3.0 | 0.23 | 0.93 |
| (b) Added as an aqueous solution containing 8.4% $Fe^{+2}$ and 26.7% $P_2O_5$: | | |
| 6.0 | | 0.17 |
| 5.0 | 0.004 | 0.63 |
| 4.0 | 0.027 | 0.90 |
| 3.0 | 0.53 | 1.70 |
| (c) Added as an aqueous solution containing 7.17% Mn and 21.73% $P_2O_5$: | | |
| 6.0 | | 0.3 |
| 5.0 | 0.004 | 0.9 |
| 4.0 | 0.03 | 1.4 |
| 3.0 | 0.75 | 3.0 |

The second treating solution for use in the process of the present invention contains hexavalent chromium as the essential coating component of the solution. The hexavalent chromium may be added to the solution as chromic acid ($CrO_3$) or as a chromic acid salt, the cations of which produces with the acidic phosphorus material a neutral salt which is insoluble or difficultly soluble in water. Exemplary of such cations are zinc, manganese, calcium, chromium, iron, or the like. Desirably, the hexavalent chromium compound is present in the solution in a concentration of about 50 to about 500 milligrams per liter, calculated as $CrO_3$. Additionally, it is also desirable that this second treating solution, as the first solution, has a pH within the range of about 3 to about 6. It is to be appreciated, however, that in some instances, concentrations of the hexavalent chromium compound both greater than and less than the preferred ranges which have been set forth hereinabove may be used, depending upon the nature of the water used in formulating the treated solution. Exemplary of amounts of chromic acid solution employed to obtain the desired pH values in both salt-free water and water of appreciable hardness are shown in Table 3, as follows:

TABLE 3

| pH | Amount of $CrO_3$ in milligrams/liter to attain pH | |
|---|---|---|
| | Salt free water | Water having total hardness of 12.8° and carbonate hardness of 9.5° |
| 6.0 | | 140 |
| 5.0 | | 300 |
| 4.0 | 10 | 500 |
| 3.0 | 100 | 750 |

It is to be appreciated that in formulating the second treating or coating solution, alkali metal chromates and bichrochromates are to be avoided as the source of hexavalent chromium since these materials will produce water-soluble neutral phosphates. Such water-soluble compounds, as has been noted hereinabove, have been found to have a deleterious effect on protective films which are subsequently applied to the coated metal surfaces.

In carrying out the process of the present invention, the first coating solution is applied to the metal surface to be treated so as to form a phosphate containing coating on the surface. Preferably, the solution is sprayed onto the surface to be treated although other contacting techniques which provide sufficient mechanical energy or agitation to produce the desired coating may also be used. The duration of the contact time of the coating solution with the surface is sufficient to effect the formation of the desired phosphate containing coating on the surface. Contact times of from about 1 to about 5 minutes are typical although both greater and lesser contact times may be used depending upon the contacting techniques which are utilized. The temperature of the coating solution may be within a wide range, e.g., between room temperature, i.e., 20 degrees centigrade, and about 100 degrees centigrade. Preferably, however, the temperature of the first coating solution is within the range of about 40 to about 70 degrees centigrade.

After the formation of the desired phosphate containing coating on the metal surface, the surface is then contacted, with no intervening water-rinse, with the second coating solution, containing the hexavalent chromium compound. Here again, various contacting techniques may be utilized, provided the desired hexavalent chromium containing coating is produced on the surface. Preferably, the hexavalent chromium containing solution is sprayed onto the phosphate coated surface, although other coating methods may be used. Typically, the time of contact between the hexavalent chromium solution and the surface to be treated is within the range of about 15 seconds to 2 minutes, although both shorter and longer contact times may be used, depending upon the coating technique employed. As with the phosphate coating solution, the hexavalent chromium containing solution temperatures are not critical, temperatures within the range of about 20 degrees to 100 degrees centigrade being satisfactory, although temperatures within the range of about 30 to about 60 degrees centigrade are preferred. After the phosphate coated surface has been contacted with the hexavalent chromium solution, the coated surfaces are desirably dried, either in the air or in a drying oven.

It is to be appreciated that the process of the present invention is readily adaptable to being carried out using automatic control apparatus. Thus, since both of the coating solutions are desirably at a pH within the range of about 3 to about 6, a pH measuring apparatus may be adjusted to the desired pH value for each of these solutions, and the thus-adjusted pH measuring apparatus may then be used to control a metering pump through which the chemicals are added to replenish the respective operating solutions. In such an operation, as the desired pH value in the treating solution is exceeded, due to the depletion of chemicals in the solution, chromic acid or phosphoric acid is added to the respective solution by the metering pump until the desired bath pH value is again attained. It is believed that the details of such an automatic control system and the manner in which it is operated are sufficiently well known to those in the art that further description of such a system as applied to the process of the present invention is not necessary.

By the process of the present invention, protective coatings are produced on metal surfaces, such as ferrous metal surfaces, having a coating weight within the range of from about 100 to 500 milligrams per square meter. Such coating weights are substantially greater than those which are obtained with phosphoric acid pickling processes in comparable periods of time, such processes producing coatings having coating weights within the range of about 15 to 30 milligrams per square meter. It is to be appreciated, of course, that by varying the operating conditions under which the present process is carried out, coating weights both greater than and less than those which have been set forth hereinabove may be attained. The coatings produced by the method of the present invention resemble in appearance and structure the layers which are produced in a phosphating process based on an alkali orthophosphate. These layers vary in color from yellowish, reddish, to blueish irridescent, and are found to provide an excellent base for a subsequently applied protective coating.

In order that those skilled in the art may better understand the present invention and the manner in which it may be practiced, the following examples are given. In these examples, unless otherwise indicated, temperatures are in degrees centigrade and percents are by weight.

EXAMPLE 1

An aqueous phosphate treating solution was formulated by dissolving 320 milligrams per liter of $P_2O_5$, introduced as $H_3PO_4$, and 200 milligrams per liter of an alkyl polyoxyalkylene ether non-ionic wetting agent, having a cloud point of 34–37° centigrade in a 1% aqueous solution and 6 moles of oxyalkylene having 2–3 carbon atoms in the alkylene group, in water having a total hardness of 12.8° and a carbonate hardness of 9.5°. The resulting solution had a pH of 4.7 and was maintained at a temperature of about 60 degrees centigrade. A second aqueous treating solution was formulated by dissolving 160 milligrams per liter of $CrO_3$ in substantially salt free water. This solution had a pH of about 3 and was maintained at a temperature of about 40 degrees centigrade. Clean steel sheets were sprayed for 3 minutes with the aqueous phosphate containing solution and thereafter, with no intermediate water rinse, were sprayed with the hexavalent chromium containing solution. Thereafter, the sheets were dried at a temperature of about 120 degrees centigrade. The chemical consumption in the phosphate containing solution was determined to be 0.18 gram of $P_2O_5$ per square meter of steel surface treated and 0.032 gram of the wetting agent per square meter of the steel surface treated. In the hexavalent chromium containing solution the chemical consumption was determined to be 0.05 gram of $CrO_3$ per square meter of steel surface treated. This chemical consumption was compensated for and the pH value in each solution was maintained substantially constant by continuously replenishing the first solution with an aqueous solution containing 50% $P_2O_5$ (added as $H_3PO_4$) and 9% of the wetting agent and replenishing the second solution with an aqueous solution containing 50% or $CrO_3$. The replenishing of the two solutions was accomplished automatically by means of a metering pump controlled by a pH measuring device. After more than two square meters of steel surface had been treated per liter of the treating solution, the coating formation on the steel sheets was still satisfactory. The coatings produced on the sheets were irridescent blue-gray in color and had a coating weight of about 300 milligrams per square meter.

The coated sheets were then lacquered and subjected for 96 hours to the salt spray test carried out in accordance with the American Society for Testing Materials Procedure D17-54T. Lacquered control sheets, as well as lacquered sheets coated with a conventional zinc phosphate coating having a coating weight of 2 grams per square meter and lacquered sheets having an iron oxide-iron phosphate layer, having a coated weight of 0.5 gram per square meter and produced from a conventional alkali orthophosphate coating solution were also subjected to the salt spray test. Using this procedure, the following results were obtained, the results being expressed as the lacquer removal, in millimeters, at the scratched or scribed portion of the sheets:

| | |
|---|---|
| Control | 10 |
| Zinc phosphate process | 1.5 |
| Alkali phosphate process | 3.0 |
| Process of present invention | 2.0 |

From these results it is seen that surfaces treated in accordance with the present two-step process are superior to untreated panels and those treated by the three step alkali phosphate process and are substantially comparable to panels treated by the five or six step zinc phosphate process.

EXAMPLE 2

The procedure of Example 1 was repeated with the exception that the coated panels were painted with an epoxy primer and top coat and were then subjected to the salt spray test. The treating solutions were continuously replenished as in Example 1 and the time in hours required to obtain a three millimeter corrosion creepage in the salt spray test for various increasing through-puts of metal surfaces treated in the solution was noted. Using this procedure, the following results were obtained:

| Through-put, in square meters of surface treated per liter of solution: | Time in hours, to obtain 3 millimeters creepage |
|---|---|
| Initial | 168 |
| 1.2 | 168 |
| 1.6 | 168 |
| 2.0 | 192 |

By way of comparison, steel sheets which had been vapor degreased with perchloroethylene and then painted with the same epoxy primer and top coat required only 30 hours to obtain a three millimeter corrosion creepage while sheets treated with the commercial zinc phosphate coating and the commercial alkali phosphate coating before painting required 168 hours and 96 hours, respectively.

EXAMPLE 3

The procedure of Example 1 is repeated using first coating solutions in which polyphosphoric acid, vinyl phosphonic acid, ethyl phosphate and dimethyl phosphate are substituted for the orthophosphoric acid. In each instance comparable results are obtained.

While there have been described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A two-step process for treating metal surfaces which consist essentially of the first step of contacting the metal surface to be treated with an aqueous acidic solution having a pH of from about 3 to 6, which solution consists essentially of at least one surface active agent and at least one acidic phosphorus material selected from the group consisting of orthophosphoric acid, polyphosphoric acid, vinyl phosphonic acid, and mono- and di-esters of orthophosphoric acid, to form a phosphate coating on said surface which is substantially water-insoluble, and, thereafter, with no intervening water rinse, the second step of contacting the thus-coated surface with an aqueous solution which consists essentially of hexavalent chromium ions, to form a coating which is substantially water-insoluble.

2. The process as claimed in claim 1 wherein the surface active agent in the first treating solution is a non-ionic surface active agent.

3. The process as claimed in claim 2 wherein at least one of the treating solutions also contains cations which produce difficultly soluble, neutral salts with the phosphoric acid material.

4. The process as claimed in claim 3 wherein the additional cations present are selected from the group consisting of zinc, manganese, calcium, magnesium and iron.

5. The method as claimed in claim 4 wherein the hexavalent chromium in the second treating solution is present in an amount within the range of about 50 to 500 milligrams per liter, calculated as $CrO_3$; and the pH of the treating solution is within the range of about 3 to 6.

6. A metal surface having a coating thereon formed in accordance with the procedure of claim 1.

References Cited

UNITED STATES PATENTS

| | | | |
|---|---|---|---|
| 2,493,327 | 1/1950 | Vance | 148—6.15 |
| 2,563,430 | 8/1951 | Spruance | 148—6.16 |
| 2,725,310 | 11/1955 | McBride | 148—6.15 X |
| 3,144,360 | 8/1964 | Palm | 148—6.15 |

RALPH S. KENDALL, *Primary Examiner.*